AMOUNTS OF THE TREATED LIQUOR (GLUTAMIC ACID FERMENTATION LIQUOR) GR./L. OF RESIN

3,505,399
PROCESS OF RECOVERING ACIDIC AMINO ACID

Hirotoshi Samejima and Akira Furuya, Tokyo-to, Yoshiatsu Aoki, Gumma-ken, and Hiroshi Teranishi, Tokyo-to, Japan, assignors to Kyowa Hakko Kogyo K.K., Tokyo-to, Japan, a corporation of Japan
Filed Mar. 24, 1966, Ser. No. 537,108
Claims priority, application Japan, Mar. 25, 1965, 40/16,957
Int. Cl. C07c 51/48
U.S. Cl. 260—527                                 8 Claims

ABSTRACT OF THE DISCLOSURE

The present invention is concerned with recovering acidic amino acid from acidic amino acid-containing solutions by contacting said solutions at a pH of less than 3 with a sulfonic acid type cation exchange resin having an active salt group, and then recovering the acidic amino acid components therefrom by use of dilute alkaline solvent to elute amino acid components.

---

The present invention is concerned with a new and improved process for recovering acidic amino acids from various solutions or liquors containing acidic amino acid as a component thereof. Specific examples include glutamic acid or aspartic acid fermentation liquor.

More particularly, the present invention is concerned with an improvement for the recovery of such acidic amino acid components by the use of sulfonic acid type cation exchange resin, whereby the acidic amino acid can be recovered in higher yields and at cheaper costs by the use of suitable conditions so as to eliminate the necessity for a distinct ion exchange resin regeneration step.

It has heretofore been known in the prior art to recover acidic amino acids by the use of sulfonic acid-type cation exchange resins. These conventional processes are characterized by basically three step operations. In the first step the acidic amino acid is "absorbed" from an acidic amino acid-containing liquor by means of a cation exchange resin which has active free acid groups (hereinafter referred to as the "H-type resin"). After amino acids have been absorbed by the H-type resin, they are "eluted" from the resin by means of treating the resin with a dilute alkaline solvent. Thereafter the ion exchange resins are "regenerated" by the use of a dilute mineral acid to give the H-type resin, the resin characterized by again having free acid groups is then returned to the absorbing step to repeat the aforementioned series of processing steps. This type of operation may be referred to as the H-type cycle.

In accordance with the present invention, it has now been discovered that the acidic amino acid can be directly absorbed from an acidic solution on to a sulfonic acid type cation exchange resin in the salt form. The step of converting the salt form of the resin into the hydrogen form of the resin is thus avoided.

More particularly in the step of absorbing acidic amino acid from the acidic amino acid-containing liquor, salt-type resins derived from the aforesaid sulfonic acid type exchange resins are utilized in the absorbing step in combination with adjusting the pH of the acidic amino acid-containing liquor to be treated to be not more than 3, preferably a pH of 0.5 to 3 and especially 0.5 to 2. It has been surprisingly found that exchange resins having active salt groups chosen from salts of ammonium, alkali metals and alkaline earth metals can effectively serve to absorb acidic amino acid components when the pH of the liquor containing same has been adjusted to be not more than 3. Thereafter the absorbed acidic amino acid components are eluted by means of a suitable alkaline solvent, thereby freeing the amino acid components for recovery as product. In contrast to the prior art procedures the salt type resins may thereafter be directly returned to the absorbing step to repeat the aforementioned steps (hereinafter referred to as the salt-type cycle), without requiring a distinct regeneration step as is the case with the conventional H-type resin cycle.

Accordingly the present invention permits effective recovery of acidic amino acid components from mixtures containing same with a smaller consumption of mineral acid to that utilized in conventional processes, wherein the ion exchange resin must be regenerated in a mineral acid treatment step. By elimination of this step not only are savings made in terms of acid costs but the desired amino acid can be recovered in a shorter period of time thereby increasing productivity while at the same time reducing the costs.

The salt-type resins of the sulfonic acid-type cation exchange resins can be salts of ammonium, alkali metals such as sodium, potassium, or alkaline earth metals such as calcium and magnesium. In general, it is preferred to use salts of ammonium or alkali metals such as potassium and sodium. When using alkaline earth metal salts such as calcium, the acid utilized in controlling the pH of the acidic amino acid-containing liquor must not form an insoluble salt with calcium, and thus acids such as sulfuric acid are avoided when calcium salts are utilized.

Commercial resins are often sold in the sodium form and thus can be used without any further preparatory treatment. However, the resin can be washed initially with a suitable acid and then with a suitable alkaline material to give the desired salt-type.

In the absorption step, the pH of the acidic amino acid-containing liquor which is to be treated with the salt-type ion exchange resin must be adjusted to fall in the range of 0.5 to 3, especially 0.5 to 2. With a pH of higher than 3, the salt-type resins are not effective in absorbing significant amounts of acidic amino acids. Particularly good absorptive capacities are demonstrated when the acidic amino acid-containing liquor has a pH of not more than 2.

After absorption of the acidic amino acid, the acidic amino acid components are recovered by an eluting step wherein the salt-type resins containing absorbed amino acid components are treated with a dilute alkaline solution. Treatment with the alkaline solution can be continued until no substantial amounts of acidic amino acids are observed in the wash. However, in general it is preferred to recover a first part of the eluted material having a more concentrated acidic amino acid composition. This can be observed by suitable detecting means such as a specific gravity of about 1.01, which shows a preferred rich cut value (pH about 8) of the acidic amino acid components. With continued eluting by the dilute alkaline solvent, the pH value tends to increase and does so sharply towards the end of the eluting step when substantially all the acidic amino acid components have been removed. The preferred alkaline concentration is about 0.5 to 3.0 normal. Particularly good results are achieved at about 1.5 to 1.8 normality. In general the alkaline conditions of the eluting solution can vary but should be maintained sufficiently alkaline to free the amino acids in reasonable concentration during the eluting step, yet not so concentrated that the amino acid is initially liberated at such high concentrations as to form crystals. After the eluting step, it is sufficient simply to wash the resin with water until no amino acid appears in the wash and thereafter directly return the salt-type resin to the absorbing step for further treatment of acidic amino acid containing liquors.

Accordingly, acidic amino acid components are recovered from acidic amino acid-containing liquor by the use of salt-type ion exchange resins with active sulfonic groups wherein the pH of the acidic amino acid-containing liquor during absorption is controlled to fall within the range of 0.5 to 3, preferably 0.5 to 2, thus permitting the salt-type resin to operate in an effective manner to eliminate the necessity for regeneration steps.

The various aspects and modifications of the present invention will be made more clearly apparent by reference to the following description, drawings and accompanying examples.

Figure 4:
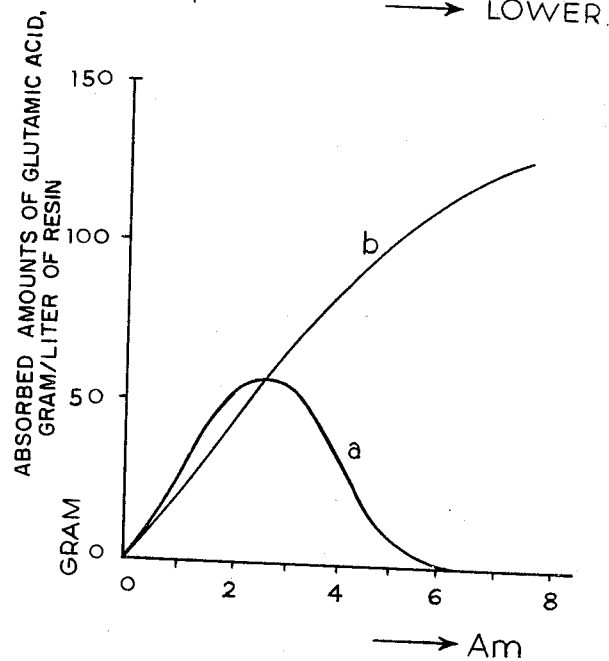

FIG. 4 compares the relationship between the amounts of absorbed glutamic acid and those of treated liquor resulting from the use of conventional techniques as compared with the present invention.

Figure 1:
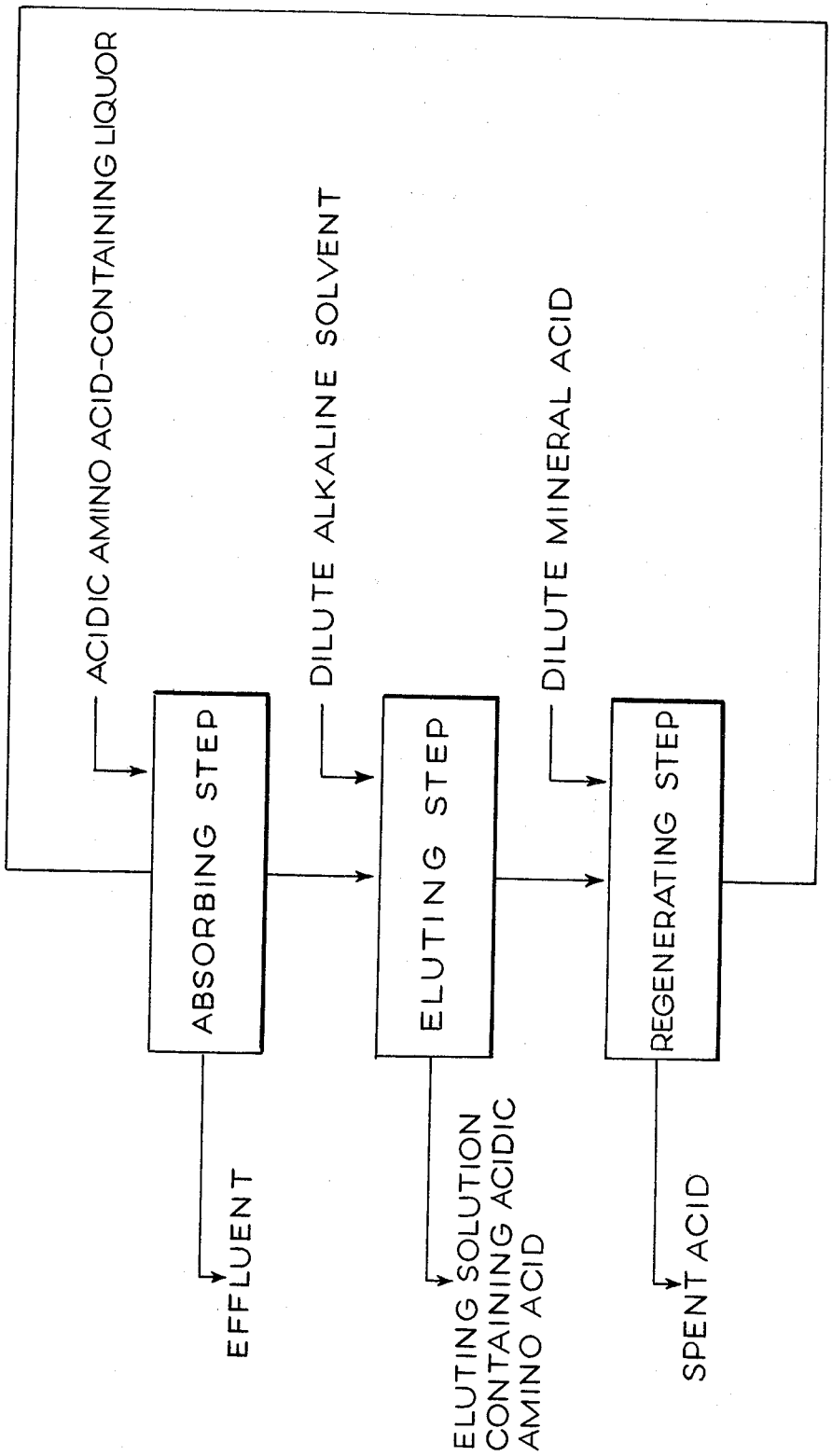
FIG. 1 illustrates the conventional process for recovering acidic amino acids by the use of sulfonic acid-type cation exchange resins.

With reference to FIG. 1, depicted in the block diagram form, is the conventional sequence of processing steps which heretofore characterized the prior art's use of sulfonic acid type resins for recovery of acidic amino acid-containing liquors. In these prior art procedures, the acidic amino acid-containing liquor was contacted with a H-type resin, i.e. a sulfonic acid type resin containing active free acid groups. The resin served to absorb the acidic amino acid, the unabsorbed materials passing from the absorption step as effluent. Thereafter the resin was sent to an eluting step wherein it is contacted with a dilute alkaline solvent which serves to liberate the acidic amino acid components which have been taken up by the ion exchange resin. Consequently, the eluting solution recovered from this step contains acidic amino acid components. After carrying out the eluting step for recovery of the acidic amino acid components the resin was then sent to a regeneration step where it was contacted with dilute mineral acids in order to regenerate same and provide active free acid groups. After the regeneration step was effected by contacting the resin with a dilute mineral acid, so as to regenerate same, the H-type resin was then recycled to the absorbing step for additional contact with acidic amino acid-containing liquor.

Figure 2:
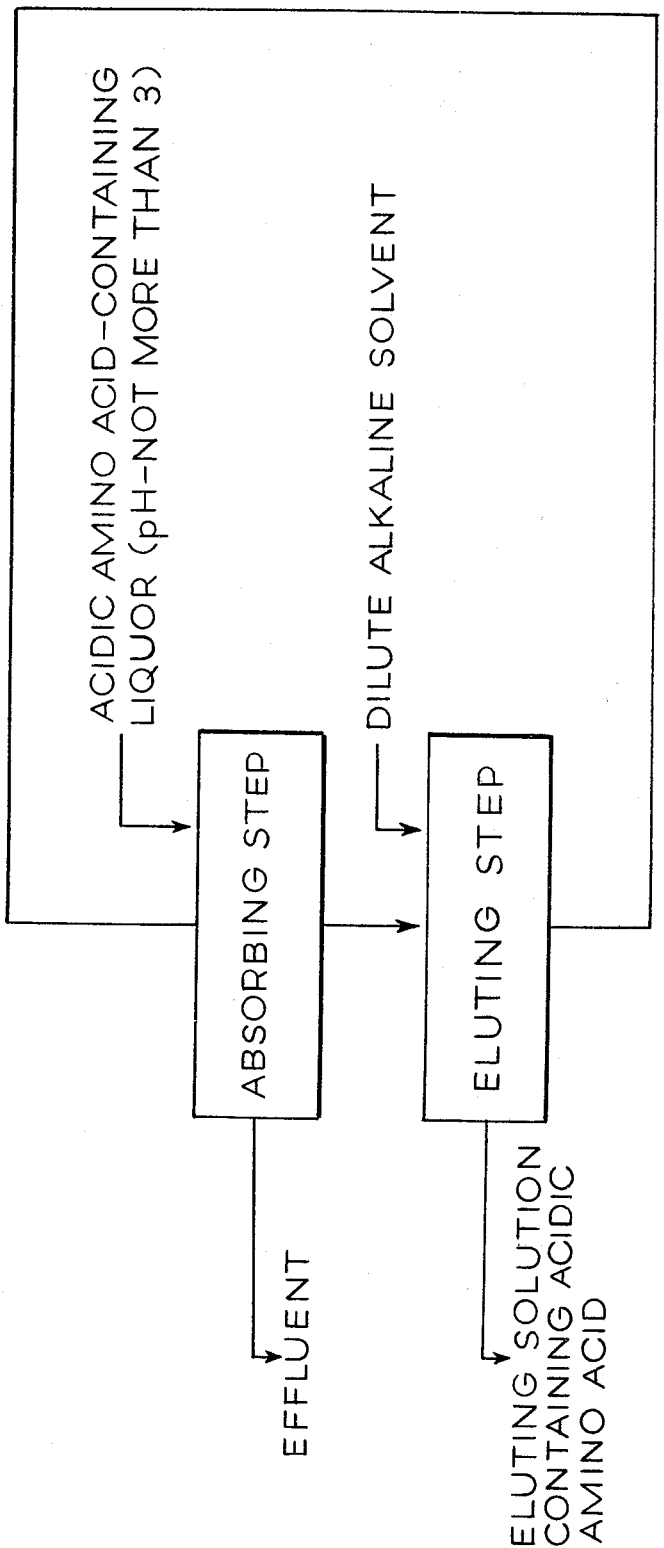
FIG. 2 shows the reduced number of steps characteristic of the present invention, wherein a salt-type cycle is employed.

In contrast to the foregoing, FIG. 2 illustrates the simplified process of the present invention. As is illustrated therein, the acidic amino acid-containing liquor is initially contacted in an absorbing step with sulfonic acid type ion exchange resins with active salt groups, i.e. salts of ammonium, sodium, potassium, etc. The pH of the amino acid-containing liquor, however, has been adjusted to be below 3, preferably 0.5 to 2. Under these conditions the salt-type resins effectively absorb the acidic amino acid components from the liquor, unabsorbed components passing from the absorption as effluent.

Thereafter, the absorbed acidic amino acid components are eluted from the salt-type resins by passing a dilute alkaline solvent through the resins, thereby freeing the acidic amino acid components. The alkaline elutiating solution may be ammonium hydroxide, sodium hydroxide, potassium hydroxide, etc., in general of the same type as the salt-type resin. After eluting the absorbed amino acid components, the salt-type resins, generally after a simple water wash, are recycled to the absorbing step to be used directly therein without a distinct regeneration step as characterized with conventional procedures. Thus, by the use of a relatively small amount of mineral acid to control the pH of the acidic amino acid liquor, it is possible to save relatively large amounts of mineral acids which are used for regeneration in the conventional H-type resin cycle. In addition, to the reduced consumption of mineral acid, the entire process can be effected in a shorter period of time with consequent increases of productivity.

The present invention further offers advantages over H-type resins since the salt type exchange resins can absorb more amino acid, e.g. glutamic acid, than the H-type resins per unit amount of resin. Thus, whereas glutamic acid can pass through an H-type resin column unabsorbed after sufficient prior absorption of glutamic acid by the H-type resin, the salt-type exchange resin is better able to absorb an excess amount of glutamic acid-containing solution.

It is generally preferred when utilizing the salt-type resin to utilize two or more units of columns connected in series, whereby any leakage of glutamic acid during the absorption step can be prevented. In view of the increased amount of glutamic acid treated by each unit of the resin column, it is preferred to treat the units of the resin columns in such a manner so that the amount of glutamic acid treated by the first unit is increased from the very first, it then being eluted by a suitable dilute alkaline solvent for recovery of acidic amino acid components while another column after eluting is connected in series relationship to the last stage of the column unit.

The mineral acid used for controlling the pH of the acidic amino acid-containing liquor can be any conventional mineral acid, such as sulfuric acid, hydrochloric acid, and the like. The exchange resins may be converted from a single salt-type to a mixed salt-type resin after repeated absorption cycles, by virtue of the mixture of salts such as ammonium, potassium, sodium, and magnesium salts present in the fermentation liquors which are introduced into the resin by the repeated contacts therewith. However, it is found that such mixed salt-type resins have little difference from any single salt-type resin with regard to the absorption capacity of glutamic acid or other amino acids, so that it makes no practical difference as to whether a single salt-type resin or mixed salt-type resin are utilized.

The advantages of the present invention are illustrated by the following examples, which refer in part to the drawings.

EXAMPLE 1

Figure 3:
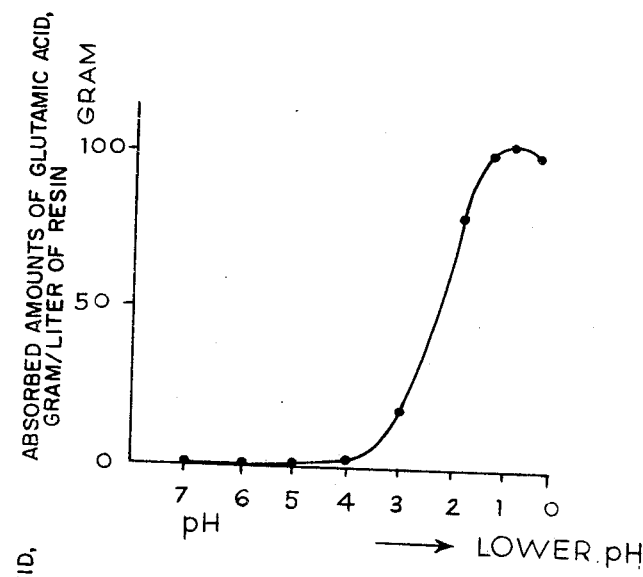
FIG. 3 shows the relationship between the amounts of absorbed glutamic acid and the pH of the treated liquor when using sulfonic acid-type cation exchange resins.

With reference to FIG. 3, different aqueous solutions of sodium glutamate, having different pH values but the same concentration of glutamic acid of 35 mg./ml., were prepared by adding sulfuric acid to the glutamic acid solution. 60 gram samples of the glutamic solution were passed down through a column packed with 20 ml. of a sodium salt type exchange resin with active sulfonic group, Diaion SK. No. 1 (a trade name, Mitsubischi Chemical Industry Co., Ltd., Tokyo, Japan).

After washing with water, the amounts of glutamic acid present in the washing water and effluent were compared with an adsorbed amount to give curves shown in FIG. 3.

In FIG. 3 it is observed that glutamic acid can be hardly absorbed when the liquor having a pH of more than about 3 is utilized, while the absorbed amounts of glutamic acid are greatly increased when the pH is controlled to be not more than about 3, particularly not more than 2, and especially 0.5 to 2.

EXAMPLE 2

With reference to FIG. 4, a glutamic acid fermentation liquor having a concentration of 28.2 mg./ml. was adjusted to have a pH value of 1.5 by adding sulfuric acid. It was then passed down through a column having a diameter of 6 cm., in which 1 liter of an ammonium salt type cationic resin with active sulfonic group was packed (Diaion SK No. 1A—a trade name). The relationship between amounts of absorbed glutamic acid per unit amount of the exchange resin and those of the treated fermentation liquor is shown in curve $b$ of FIG. 4.

For purposes of comparison, the aforesaid column was regenerated with 1.2 liter of 2-N sulfuric acid to give an H-type exchange resin, down through which a glutamic acid fermentation liquor (a pH of 7; concentration of 28.2 mg./ml.) was passed to give the corresponding relationship for the H-type resin, as shown by curve $a$ of FIG. 4. As illustrated by FIG. 4, the conventional treatment can give rise to the diminution of the amount of glutamic acid absorbed when an amount of the treated liquor exceeds a certain extent. It is true, since other cations (for example cations of ammonium, potassium, sodium, calcium, etc.) present in said liquor may replace the glutamic acid ion, which has lower selective absorption capacity than such cations, thus discharging the latter into effluent. Meanwhile, it is further observed that the amount of glutamic acid absorbed by treatment of a liquor (pH—1.5) with salt-type resin is more than twice of that obtained by the H-type resin. It is true since that disassociation of amino group of glutamic acid rapidly increases when the liquor has a pH of not more than 3, preferably not more than 2. As a result, a cation of glutamic acid has an increased selective absorption capacity so as to be exclusively absorbed by the exchange resin.

EXAMPLE 3

With further reference to FIG. 4, the consumed amount of acid (for example, sulfuric acid) obtained from the treatment of a liquor having a pH of 7 by means of the H-type exchange resin was compared with that obtained from a liquor having a pH of 1.5 by means of the salt-type resin to give the following results:

It is necessary to consume 1.2 liters of 2-N sulfuric acid (or 2.4 grams equivalent) for the regeneration per 1 liter of the H-type exchange resin. In other words, 40 grams equivalent of sulfuric acid is consumed per 1 kg. of absorbed glutamic acid. It is true, since that the maximum amount of absorbed sulfuric acid is 60 grams (FIG. 4). On the other hand, it is observed with regard to the consumption of the H-type resin that 2.5 liters of a fermentation liquor having a pH of 1.5 is treated to absorb 60 grams of glutamic acid per 1 kg. of the H-type resin. Meanwhile, the necessary amount of sulfuric acid for preparing the fermentation liquor having a pH of 1.5 corresponds to 1.152 grams equivalent thereof so that the sulfuric acid consumption can be regarded to be 19.2 grams equivalent per 1 kg. of the absorbed sulfuric acid.

Therefore, the ratio of the consumed amount of sulfuric acid in utilizing the salt-type resin to that in utilizing the H-type resin may be about 1:2. This illustrates one of the advantages of the present invention, i.e. of reduced acid consumption.

EXAMPLE 4

One liter of Diaion SK No. 1A (a trade name of sulfonic acid type cation exchange resin), was treated to form an active ammonium salt-resin and packed in a column having 6 cm. diameter. Meanwhile a glutamic acid fermentation liquor obtained by culturing *Micrococcus glutamicus* in a nutritive medium was diluted with water and sulfuric acid to obtain an adjusted pH of 1.5. Then 3 liters of supernatant liquor obtained by centrifugation (concentration of glutamic acid—34.5 mg./ml.) were passed down through the said column (SV-2) and afterward the column was washed with 2 liters of water to obtain an effluent. The concentration of glutamic acid in 5 liters of said effluent was measured 2.8 mg./ml.

In other words, 89.5 grams of glutamic acid was absorbed by 1 liter resin. The column was maintained at a temperature of not less than 40° C. and treated with 1.2-N ammonia water to obtain 1.2 liters of a simple containing glutamic acid, which had a concentration of 71.9 mg./ml.

The eluted resin column was thoroughly washed with water. Immediately after this, the column was passed by 3 liters of a similar glutamic acid fermentation liquor to obtain a result that 89.0 grams of glutamic acid was absorbed by 1 liter resin measured in the same manner as described above. After eluting glutamic acid with 1.2-N ammonia water, the resin was utilized for further operation with the repetition of the aforementioned manner, to absorb 88.2, 88.8 and 88.4 grams of glutamic acid by the third, fourth and fifth absorption, respectively.

EXAMPLE 5

One liter of Dowex 50 WX 8 (a trade name of sulfonic acid type exchange resin) was treated to be in the active ammonia salt form and packed in a column having 6 cm. diameter. Meanwhile an aspartic acid fermentation liquor, which is obtained from suitable micro-organisms, and ammonium fumarate as a main nutrient, was diluted in a similar manner described in Example 1 to give a pH of 1.2. Then 3 liters of supernatant liquor obtained by centrifugation (concentration of aspartic acid—38.2 mg./ml.) was treated in an analogous manner described in Example 1 to obtain a concentration of aspartic acid of 2.6 mg./ml. In other words, 101.6 grams of aspartic acid was absorbed by 1 liter resin. The column was treated in an analogous manner described in Example 4 to obtain 1.2 liter of a sample containing aspartic acid of, which concentration was 84.0 mg./ml.

The obtained column was treated in an analogous manner described in Example 4 to absorb 102.1 grams of aspartic acid per 1 liter resin.

EXAMPLE 6

One liter of Diaion SK. No. 1A (a trade name of sulfonic acid type resin) was treated with ammonium hydroxide to give an active ammonium salt and packed in columns having the same diameter of 6 cm. Two such columns were connected together in series relationship. 3 liters of glutamic acid fermentation liquor obtained in an analogous manner described in Example 4 (concentration of glutamic acid—34.5 mg./ml.; pH—1.5) was then passed down through the first and second column in turns. Immediately after this, 2 liter of water was passed through the columns in turns and then the first column was omitted from the system.

In the second trial, the former first column was utilized as the first column and another column prepared in the aforementioned manner was connected to the first column in series relationship as the second column. Then 3 liters of glutamic fermentation liquor and 2 liters of water were passed through these columns in turns in an analogous manner described in the first trial.

In both trials, any leakage of glutamic acid from the last stage was hardly observed. The first column of the first trial and the second column of the second trial were maintained at a temperature of more than 40° C. and then eluted with 1.2-N ammonia water to obtain 1.2 liters of respective samples of eluting solution containing glutamic acid. Measurement of the respective samples showed that amounts of recovered glutamic acid were 86.5, 98.4 and 20.3 grams respectively.

Having described the present invention, that which is sought to be protected is set forth in the following claims.

What is claimed is:

1. A process for recovering an acidic amino acid selected from the group consisting of glutamic acid and aspartic acid from a solution containing same which comprises contacting said solution having its pH controlled to be less than 3 with a sulfonic acid type cation exchange resin having an active salt group, said salt being selected from the group consisting of ammonium, alkali metal and alkaline earth metal salts; and recovering said absorbed acidic amino acid selected from the group consisting of glutamic acid and aspartic acid by thereafter contacting said resin with a dilute alkaline solution selected from the group consisting of aqueous ammonia solution and aqueous metal hydroxide solution.

2. The process of claim 1 wherein said cation exchange resin containing active salt groups is passed from said eluting step to said absorption step so as to recover additional amounts of acidic amino acid components.

3. The process of claim 1 wherein said ion exchange resin is in the form of an ammonium salt.

4. The process of claim 1 wherein said ion exchange resin is in the form of a sodium salt.

5. The process of claim 1 wherein the pH of said acidic amino acid-containing solution is adjusted to fall within the range of 0.5 to 2 when contacted with said action exchange resin having active salt groups.

6. A process of recovering an acidic amino acid selected from the group consisting of glutamic acid and aspartic acid from a liquor containing same which comprises the steps of:

(1) contacting said liquor having a pH of 0.5 to 3 with a sulfonic acid-type cation exchange resin having an active salt group so as to absorb said acidic amino acid component by said resin, said salt group being selected from the class consisting of ammonium, alkali and alkaline earth metal salt;

(2) thereafter eluting absorbed acidic amino acid components by contacting said resin with a dilute alkaline solvent selected from the group consisting of aqueous ammonia and aqueous metal hydroxide solution so as to recover said member of the group consisting of glutamic acid and aspartic acid thereby;

(3) thereafter recycling said sulfonic acid-type cation exchange resin containing an active salt group to said absorption step for further recovery of said acidic acid components.

7. The process of claim 6 wherein the pH of said acidic amino acid-containing liquor has been adjusted by addition of mineral acid to fall within the range 0.5 to 2.

8. The process of claim 6 wherein said ion exchange resin is in the form of an ammonium salt.

References Cited

UNITED STATES PATENTS

| | | | |
|---|---|---|---|
| 2,894,026 | 7/1959 | Hause et al. | 260—534 |
| 3,318,867 | 5/1967 | Jahnke | 260—534 |

LORRAINE A. WEINBERGER, Primary Examiner

E. J. GLEIMAN, Assistant Examiner

U.S. Cl. X.R.

260—534